(12) United States Patent
Hayes et al.

(10) Patent No.: US 8,023,831 B1
(45) Date of Patent: Sep. 20, 2011

(54) COHERENT RF-PHOTONIC LINK LINEARIZED VIA A NEGATIVE FEEDBACK PHASE-TRACKING LOOP

(75) Inventors: Robert R. Hayes, Calabasas, CA (US); Willie W. Ng, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 12/966,900

(22) Filed: Dec. 13, 2010

Related U.S. Application Data

(62) Division of application No. 11/413,270, filed on Apr. 28, 2006, now Pat. No. 7,877,020.

(51) Int. Cl.
*H04B 10/04* (2006.01)

(52) U.S. Cl. ........ 398/198; 398/188; 398/183; 398/202; 398/140

(58) Field of Classification Search .................. 398/198, 398/183, 188, 202, 206, 140, 214
See application file for complete search history.

(56) References Cited

U.S. PATENT DOCUMENTS

| | | | |
|---|---|---|---|
| 3,961,262 A | 6/1976 | Gaassmann | |
| 4,718,121 A | 1/1988 | Epworth | |
| 4,944,025 A | 7/1990 | Gehring et al. | |
| 4,965,858 A | 10/1990 | Naito et al. | |
| 5,003,626 A | 3/1991 | Kuwahara et al. | |
| 5,007,106 A | 4/1991 | Kahn et al. | |
| 5,023,946 A | 6/1991 | Yamazaki et al. | |
| 5,035,245 A | 7/1991 | Nakamura et al. | |
| 5,060,312 A | 10/1991 | Delavaux | |
| 5,124,828 A | 6/1992 | Mahon | |
| 5,281,973 A | 1/1994 | Murphy et al. | |
| 5,319,438 A * | 6/1994 | Kiasaleh | 398/203 |
| 5,323,258 A * | 6/1994 | Tsushima et al. | 398/203 |
| 5,337,056 A | 8/1994 | Dax | |
| 5,400,167 A | 3/1995 | Suemura | |
| 5,412,351 A | 5/1995 | Nystrom et al. | |
| 5,424,863 A * | 6/1995 | Gertel | 398/152 |
| 5,477,369 A * | 12/1995 | Mahon et al. | 398/202 |
| 5,510,927 A | 4/1996 | Noe | |
| 5,510,929 A * | 4/1996 | Singh et al. | 359/322 |
| 5,532,857 A | 7/1996 | Gertel et al. | |
| 5,757,531 A | 5/1998 | Tomesen et al. | |

(Continued)

OTHER PUBLICATIONS

USPTO Office Action, mailed Jun. 22, 2010 for U.S. Appl. No. 11/796,172, filed Apr. 27, 2007, Inventor Robert R. Hayes.

(Continued)

*Primary Examiner* — Ken Vanderpuye
*Assistant Examiner* — Hibret Woldekidan
(74) *Attorney, Agent, or Firm* — Christopher R. Balzan

(57) ABSTRACT

In one of many possible implementations and embodiments, a method is provided for providing linearized phase modulation and demodulation in an RF-photonic link. This includes phase modulating a photonic carrier signal in a signal arm using the RF input and using the RF output in a negative feedback phase tracking loop to modulate either the RF input modulated carrier signal in the signal arm, or a signal in a local oscillator arm. Optical signals from the signal arm and the local oscillator arm are optically coupled. The optically coupled signals are photodetected and differentially combined. The differentially combined signals are amplified to provide the RF output signal. In some implementations, the photonic carrier signal is suppressed prior to photodetection. Further, in some implementations a small portion of the local oscillator signal may be coupled with the carrier suppressed optical signal.

16 Claims, 5 Drawing Sheets

U.S. PATENT DOCUMENTS

| | | | |
|---|---|---|---|
| 5,777,778 A | 7/1998 | Yao | |
| 5,861,781 A | 1/1999 | Ashby | |
| 6,091,535 A | 7/2000 | Satoh | |
| 6,233,085 B1 | 5/2001 | Johnson | |
| 6,580,532 B1 | 6/2003 | Yao et al. | |
| 6,646,746 B1 * | 11/2003 | Sorin et al. | 356/451 |
| 6,738,713 B2 | 5/2004 | Pratt | |
| 6,850,749 B2 | 2/2005 | Soorapanth et al. | |
| 6,914,560 B2 | 7/2005 | Spilker et al. | |
| 6,985,698 B2 | 1/2006 | Aggarwal et al. | |
| 6,990,296 B2 * | 1/2006 | Choudhary et al. | 398/188 |
| 7,103,327 B2 | 9/2006 | Pan | |
| 7,200,343 B2 | 4/2007 | Ikeuchi | |
| 7,266,311 B2 | 9/2007 | Haunstein et al. | |
| 7,330,669 B2 | 2/2008 | Moeller | |
| 7,368,694 B2 | 5/2008 | Goulas et al. | |
| 7,382,257 B2 | 6/2008 | Thomas et al. | |
| 7,389,055 B1 | 6/2008 | Rickard et al. | |
| 7,394,331 B2 | 7/2008 | Yeung et al. | |
| 7,397,979 B2 | 7/2008 | Shpantzer et al. | |
| 7,406,269 B2 | 7/2008 | Becker et al. | |
| 7,444,085 B2 | 10/2008 | Ikeuchi et al. | |
| 7,460,793 B2 * | 12/2008 | Taylor | 398/208 |
| 7,574,139 B2 * | 8/2009 | Fu et al. | 398/98 |
| 7,817,923 B2 * | 10/2010 | Akiyama et al. | 398/188 |
| 7,826,752 B1 * | 11/2010 | Zanoni et al. | 398/205 |
| 7,877,020 B1 * | 1/2011 | Hayes et al. | 398/198 |
| 2003/0193711 A1 | 10/2003 | Hildebrand | |
| 2004/0160661 A1 | 8/2004 | Hurrell et al. | |
| 2004/0259518 A1 | 12/2004 | Aktas et al. | |
| 2005/0100281 A1 | 5/2005 | Kim et al. | |
| 2005/0111789 A1 | 5/2005 | Hayes | |
| 2006/0045809 A1 | 3/2006 | Shirai et al. | |
| 2006/0120733 A1 * | 6/2006 | Tucker et al. | 398/204 |
| 2007/0071456 A1 | 3/2007 | Chen et al. | |
| 2009/0047030 A1 | 2/2009 | Hoshida | |

OTHER PUBLICATIONS

USPTO Office Action, mailed Oct. 1, 2009 for U.S. Appl. No. 11/796,172, filed Apr. 27, 2007, Inventor Robert R. Hayes.

USPTO Notice of Allowance, mailed Sep. 13, 2010 for U.S. Appl. No. 11/796,172, filed Apr. 27, 2007, Inventor Robert R. Hayes.

* cited by examiner

COHERENT RF-PHOTONIC LINK LINEARIZED VIA A NEGATIVE FEEDBACK PHASE-TRACKING LOOP

CROSS REFERENCE TO RELATED APPLICATION

The present application is a divisional of U.S. patent application Ser. No. 11/413,270, filed Apr. 28, 2006 now U.S. Pat. No. 7,877,020; by Hayes et al., entitled COHERENT RF-PHOTONIC LINK LINEARIZED VIA A NEGATIVE FEEDBACK PHASE-TRACKING LOOP herein incorporated by reference in its entirety.

BACKGROUND

The photonic transmission of high frequency microwave signals is typically accomplished by impressing the RF as an envelope on the amplitude of an optical carrier, using either an electro-optic (EO) or electro-absorption (EA) modulator. Although linearized EO modulators have been proposed for many years, the vast majority of modulators available for analog transmission still suffer from intrinsic nonlinearities in their transfer function. For example, the most common Mach Zehnder EO modulator possesses a raised-cosine modulation transfer curve.

As a result, intermodulation products and harmonic distortions are incurred at the transmitter end of these intensity or amplitude modulated analog links, giving rise to well-known impairments of the link's spur free dynamic range (SFDR).

Thus, what is needed is a high spur free dynamic range in an optical link. Further, what is needed is a high spur free dynamic range in an optical link for high frequency signals.

SUMMARY

In one of many possible implementations and embodiments, a method is provided for providing linearized phase modulation in an RF-photonic link having an RF input and an RF output. The method includes phase modulating a photonic carrier signal in a signal arm using the RF input. The method further includes using the RF output in a negative feedback phase tracking loop to modulate either the RF input modulated carrier signal in the signal arm, or a signal in a local oscillator arm. Optical signals from the signal arm and the local oscillator arm are coupled to provide coupled optical signals. The coupled optical signals are photodetected and differentially combined. The differentially combined signals are amplified to provide the RF output signal.

In some implementations, the photonic carrier signal is suppressed prior to photodetection. Further, in some implementations a small portion of the local oscillator signal may be coupled with the carrier suppressed optical signal.

In one embodiment, a receiver is provided for an RF photonic link, the receiver includes a local oscillator arm adapted to receive an oscillator signal from a transmitter. The receiver further includes a signal arm comprising an electro-optic phase tracking modulator adapted to receive an RF modulated oscillator signal from the transmitter, the phase tracking modulator comprising a modulating input. The receiver also an optical coupler connected to optically couple modulated output signals from the phase tracking modulator and signals from the local oscillator arm. Additionally, the receiver includes a photodetector circuit positioned to be capable of detecting signals coupled by the optical coupler and providing an output. The receiver further includes an electrical amplifier positioned to provide an RF output responsive to the output of the photodetector circuit output. The receiver also includes a phase tracking negative feedback loop circuit coupled between the RF output of the amplifier and the modulating input of the phase tracking modulator.

BRIEF DESCRIPTION OF THE DRAWINGS

The features and advantages of the present invention will be better understood with regard to the following description, appended claims, and accompanying drawings where:

DESCRIPTION

Phase Modulated RF-Photonic Link

Figure 1:
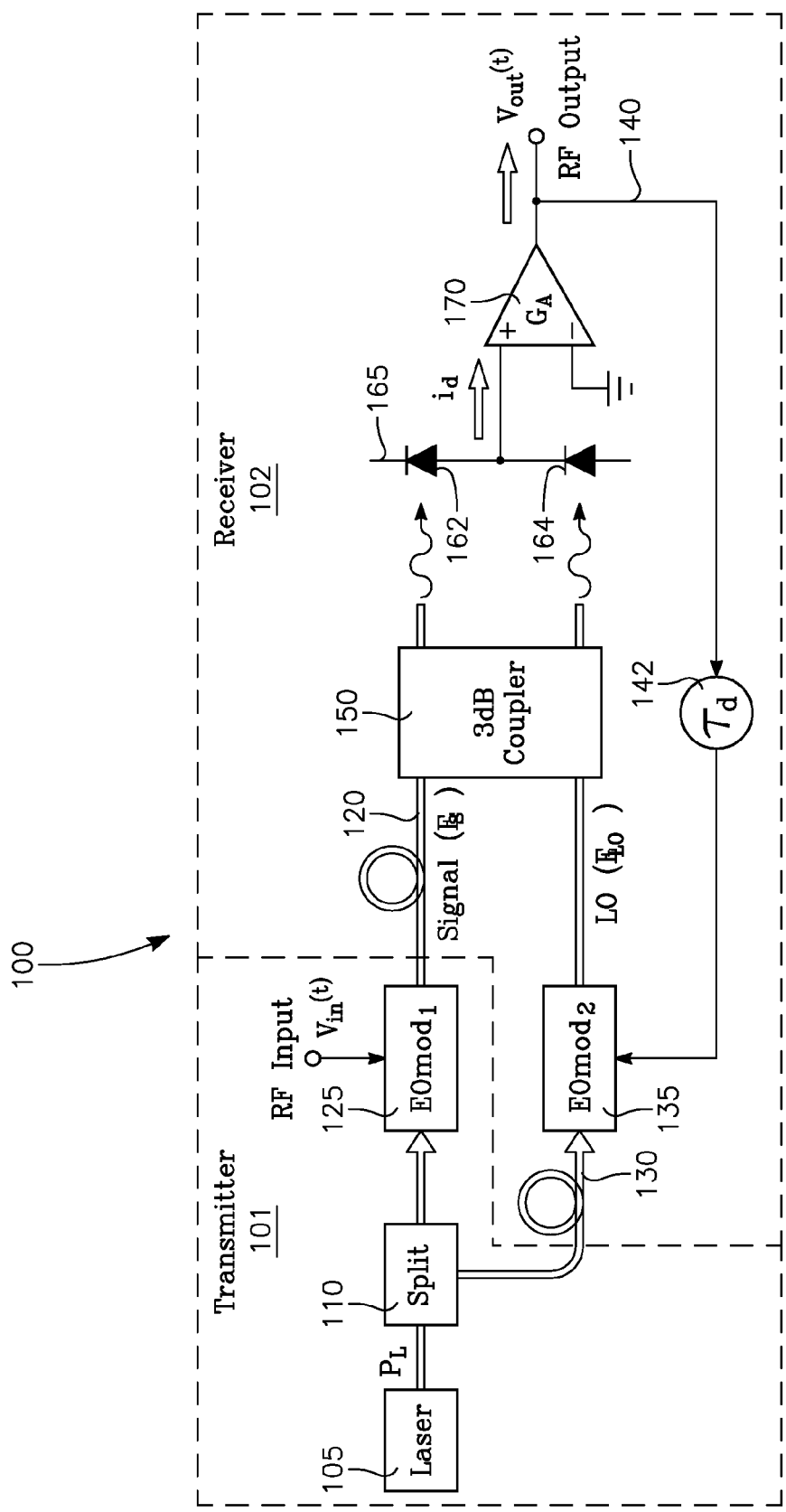
FIG. 1 shows a simplified circuit diagram of one possible embodiment of a phase-modulated RF-photonic link.

FIG. 1 shows a simplified circuit diagram of one embodiment of a phase modulated RF-photonic link 100. Electro-optic phase modulation (PM) is intrinsically linear. In fact, the phase modulation of an optical carrier by an RF Input voltage $V_{in}(t)$ can be expressed as: $\phi(t)=[V_{in}(t)\pi]/V_\pi$, where $V_\pi$ is the half-wave voltage of the phase modulator. The demodulation of the signal, however, requires the homodyning (or heterodyning) of optical fields derived from the signal-arm ($E_s$, of frequency $\omega_s$) and local oscillator arm ($E_{LO}$, of frequency $\omega_{LO}$) of the link shown in FIG. 1.

If the phases of the optical fields in the signal arm 120 and local oscillator (LO) arm 130 are given by $\phi_s(t)$ and $\phi_{LO}$ respectively, then the beat-term that allows one to recover the phase-modulation $\phi_s(t)$ is given by: $E_s E_{LO} \cos[(\omega_s-\omega_{LO})t+(\phi_s-\phi_{LO})]/2$. Assuming that $\phi_{LO}$ has been phase locked to optimize phase-detection, the phase-modulation $\phi_s(t)$ needs to be extracted from a photocurrent $i_d$ that is proportional to $E_s E_{LO} \sin[(\omega_s-\omega_{LO})t+\phi_s(t)]$. Since $\phi_s(t)$ is part of a sine function's argument, phase-demodulation in a conventional coherent receiver suffers from sinusoidal nonlinearities due to the very process of heterodyning (or homodyning if $\omega_s=\omega_{LO}$).

The receiver (shown as 102 in FIG. 1 or 202 in FIG. 2) of the various embodiments of RF-photonic link described herein linearizes the phase detection process by using negative feedback to instantaneously track the phase of the incoming lightwave. It does this either by canceling the phase modulation on the incoming lightwave with a second phase modulator (located in the receiver 202 in FIG. 2), or by generating a second lightwave (FIG. 1) that has the same phase modulation as the incoming lightwave, and then subtracting the phases of the two lightwaves and requiring that the phase difference asymptotically approach zero. When the difference is zero, the voltage applied to the receiver phase modulator used for this cancellation (or subtraction) process is directly proportional to the phase of the transmitted signal. Because the phase modulation process is perfectly linear, the voltage used to drive the second modulator will be a near exact replica of the RF signal used as the transmitter (101 in FIG. 1). Using a coherent RF-photonic link, coupled with the linearity of phase modulation, significant enhancements in SFDR over other link designs (such as IM/DD, amplitude-modulated and conventional phase-modulated schemes) are possible. Further, by applying simultaneously carrier-suppressed and linearized coherent detection, as shown in some embodiments, discussed with reference to FIGS. 4 & 5, it is possible to surpass the SFDR of current RF-photonic links by tens of decibels.

The embodiment of FIG. 1 shows a linearized phase-modulated coherent RF-photonic link 100 that utilizes a negative feedback phase lock loop 140 to suppress nonlinear distortions generated during optical heterodyning or homodyning in the coherent link 100. In particular, it allows us to take full advantage of the perfect linearity offered by electro-optic (EO) phase modulation—as opposed to intensity/amplitude modulation—for the high fidelity transmission of analog signals. Using the disclosed approach, the link's spur free dynamic range is enhanced by a factor equal to $G_L^2$, where $G_L$ is the loop-gain derived from the phase-tracking loop 140 incorporated in the coherent receiver 102.

The physical layout of a homodyne approach is especially attractive for antenna remoting applications that utilize external modulation. In these applications, the single frequency laser source 105 is typically co-located with the optical receiver (photodetectors 165 and amplifier 170) in a secure area. Therefore, one can tap off a small fraction of its output power $P_L$ with a splitter 110 and use it as the local oscillator (LO) in the coherent receiver 102. Using this homodyne approach substantially simplifies the hardware requirements for the coherent link 100. To achieve optimal coherent detection, one only needs to keep the relative time-delay between the signal arm 120 and LO arm 130 to less than the inverse of the linewidth of the laser source 105.

As shown in FIG. 1, an electro-optic phase modulator 125 (denoted EO mod$_1$) is used at the transmitter 101 to impress the RF Input on an optical carrier, for example at $\lambda$=1550 nm. The linear electro-optic (EO) effect is exploited to accomplish an optical phase-modulation that is directly proportional to the input RF Input voltage $V_{in}(t)$. In terms of $V_\pi$, the modulator's half-wave voltage, the phase modulation of the optical carrier is given by: $\phi(t)=[V_{in}(t)\pi]/V_\pi$.

Homodyne (or heterodyne) detection of a phase-modulated optical carrier introduces sinusoidal nonlinearities. In conventional coherent receivers, the phase modulation $\phi(t)$ is recovered from a beat-signal that is proportional to $[E_s E_{LO} \sin(\omega_{LO}t-\omega_s t+\phi(t))]/2$, where $E_s$ and $E_{LO}$ denote, respectively, the input optical fields of the signal arm 120 (of frequency $\omega_s$) and LO arm 130 (of frequency $\omega_{LO}$). For a homodyned coherent optical link, $\omega_s=\omega_{LO}$, and the source of the nonlinearity of the detected signal, $\sin(\phi(t))$, becomes apparent. To achieve a large SFDR in a coherent RF-photonic link 100, one needs to devise an approach that can recover the optical phase $\phi(t)$ with little or no distortion at the receiver 102. This is precisely the function of the phase-tracking loop 140 depicted in FIG. 1. As illustrated, it utilizes a second phase tracking modulator 135 (denoted EO mod$_2$) that we drive with a feedback voltage tapped off the output $V_{out}(t)$ of the RF-photonic link 100.

Using the phase tracking modulator 135, the photocurrent $I_i$ (i=1, 2) obtained from the two photodiodes 162, 164, (each with quantum efficiency $\eta_d$) in the double-balanced (differential) photodiode receiver 165 becomes:

$$I_i = \eta_d\left(\frac{E_s^2}{4} + \frac{E_{LO}^2}{4} \pm \frac{E_s E_{LO}}{2}\sin(\phi-\theta)\right) \quad (1)$$

Notice that the sinusoidal signal of the homodyned output now has a new argument $\epsilon=(\phi-\theta)$, as opposed to the $\phi(t)$ discussed above. Expressing the differential photocurrent $\Delta i_d$ ($=I_1-I_2$) that feeds the post-amplifier 170 of the receiver 102 in terms of photocurrents due to the signal arm 120 ($I_s=E_s^2/2$) and LO arm 130 ($I_{LO}=E_{LO}^2/2$), yields the following:

$$\Delta i_d = 2\sqrt{I_s I_{LO}}\sin(\phi-\theta) = 2\sqrt{I_s I_{LO}}\sin(\epsilon) \quad (2)$$

Thus, the coupler 150 along with and the detectors 165 provide a dual balanced detector system that couples and converts the photonic signals of signal arm 120 and LO arm 130 to the differential current $i_d$.

The linearization mechanism of the phase-tracking loop becomes transparent when we solve for the loop's output voltage $V_{out}(t)$, obtained after the post-amplifier [with Gain=$G_A(\omega_m)$]. Accomplishing that, the argument of the sine-term in the equation (2) is $\epsilon=[\pi V_{in}/(V_\pi)_\phi]G_L^{-1}$, as opposed to $\phi=[\pi V_{in}/(V_\pi)_\phi]$ for a conventional homodyne link that has no phase tracking. Here, $(V_\pi)_\phi$ and $G_L$ denote, respectively, the half-wave voltage of the EO mod$_1$ 125 and the loop-gain in the phase-tracking loop 140. Typically, $G_L$ is designed to be much greater than 1 for linearization. Therefore, the magnitude of the argument for the sinusoidal term (in Eq. 2) is substantially reduced via negative feedback. This argument reduction [from $\phi(t)$ to $\epsilon(t)$] is the mechanism responsible for our link linearization, and the subsequent enhancement in SFDR. For a half-wave voltage $(V_\pi)_\theta$ in the tracking-modulator $\theta$-mod, $G_L$ is given by:

$$G_L(\omega) = \left|1 + 2\sqrt{I_{LO}I_s}\,D\left(\frac{\pi}{(V_\pi)_\theta}\right)G_A(\omega)e^{-j\omega\tau_d}\right| \quad (5)$$

where D is a transimpedance (in $\Omega$), and $\tau_d$ represent the aggregate time-delay, illustrated at 142, in the feedback loop 140. Note that the time delay $\tau_d$ may be inherent in, or designed into the path length of the feedback loop 140, and not a separate component, or structure as shown for discussion purposes.

The time of propagation through the phase tracking feedback loop 140 is such that it corresponds to less than 180 degrees at the highest operating frequency for which there is unity gain greater than 1. (The unity gain is for entire phase tracking loop 140.) This will keep the feedback loop 140 from causing oscillations.

In some embodiments, the post-amplifier 170 may be an operational amplifier (OpAmp) that possesses: (i) a single-pole response, and (ii) a large gain-bandwidth product $f_t$. For such an amplifier, the frequency response $G_A(\omega)$ can be modeled as:

$$G_A(\omega) = \frac{G_o}{1 + j\frac{\omega}{\omega_t}G_o} \quad (6)$$

where $\omega_t=2\pi f_t$, and $G_o$ is the open loop gain of the amplifier 170 at low frequencies. Using a transistor-$f_t$ of 406 GHz offered by InP-HBT technologies, it should be possible to attain a large amplifier gain-bandwidth product ($f_t$) greater than 50 GHz. This will, in turn, help boost the loop gain available for link linearization.

Figure 2:
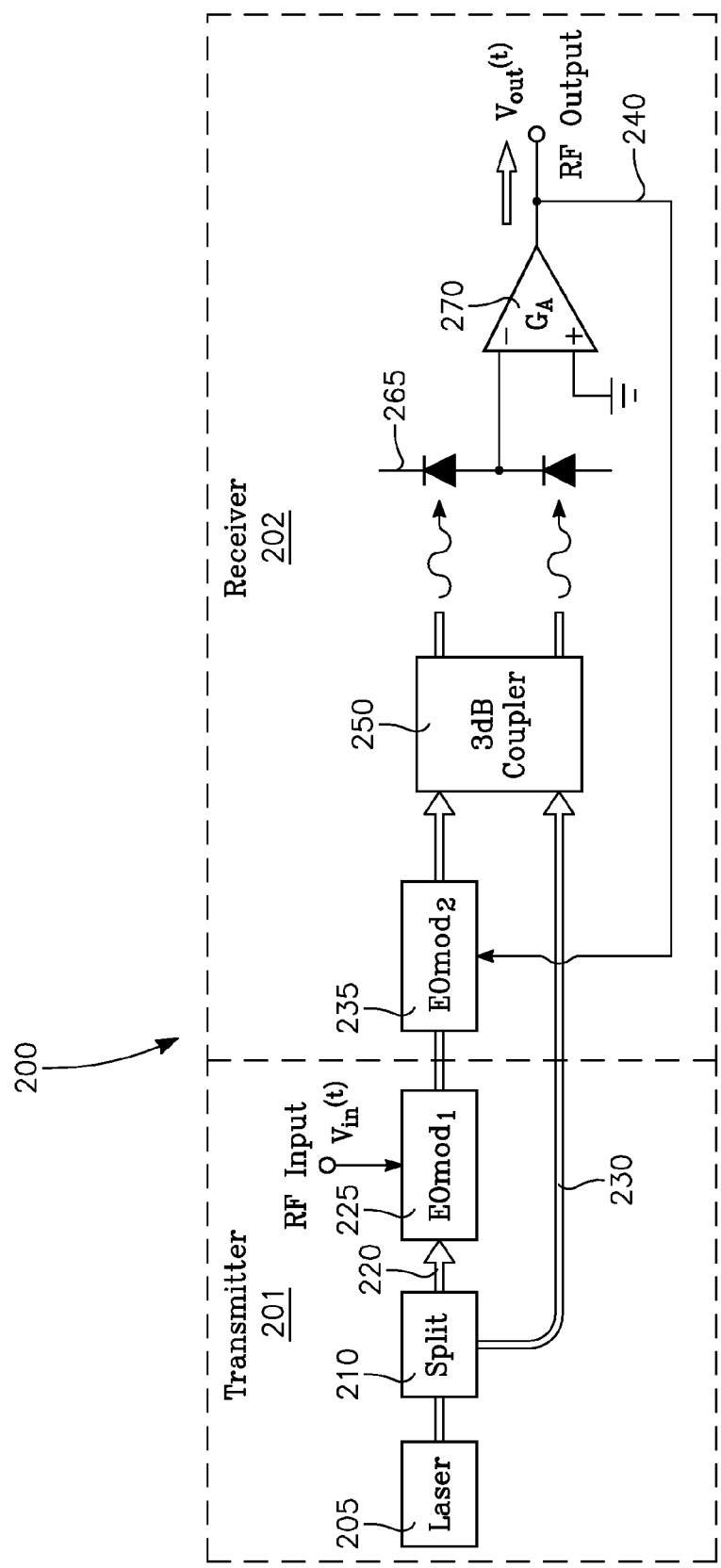
FIG. 2 shows a simplified circuit diagram of one possible embodiment of a phase-modulated RF-photonic link.

FIG. 2 shows a simplified circuit diagram of an alternate embodiment of a phase-modulated RF-photonic link 200. In this embodiment, the phase lock loop 240 provides the negative feedback to a phase tracking modulator 235, labeled EO mod$_2$, coupled in the signal arm 220, rather than the local oscillator arm 230. Thus, in the transmitter 201, the laser 205 supplies light to the signal arm 220 and the local oscillator arm 230. The signal arm 220 includes a RF input phase modulator 225, labeled EO mod$_1$. The RF Input signal Vin(t) is the modulating input to the EO mod$_1$ modulator 225. The RF input modulated signal from the EO mod$_1$ modulator 225 is supplied to the phase tracking modulator 235 in the receiver 202. The phase tracking modulator 235 provides phase tracking to facilitate coherent phase-detection.

The optical signals from the signal arm 220 and the local oscillator arm 230 are coupled with a coupler 250 in the receiver 202, such as a 3 dB coupler, and provided to photodetectors 265. The photodetected signals is supplied to an amplifier 270, which provides the RF Output V$_{out}$(t). The return path 240r of the phase lock loop 240 couples the RF Output signal V$_{out}$(t) to the phase tracking modulator 235.

Figure 3:
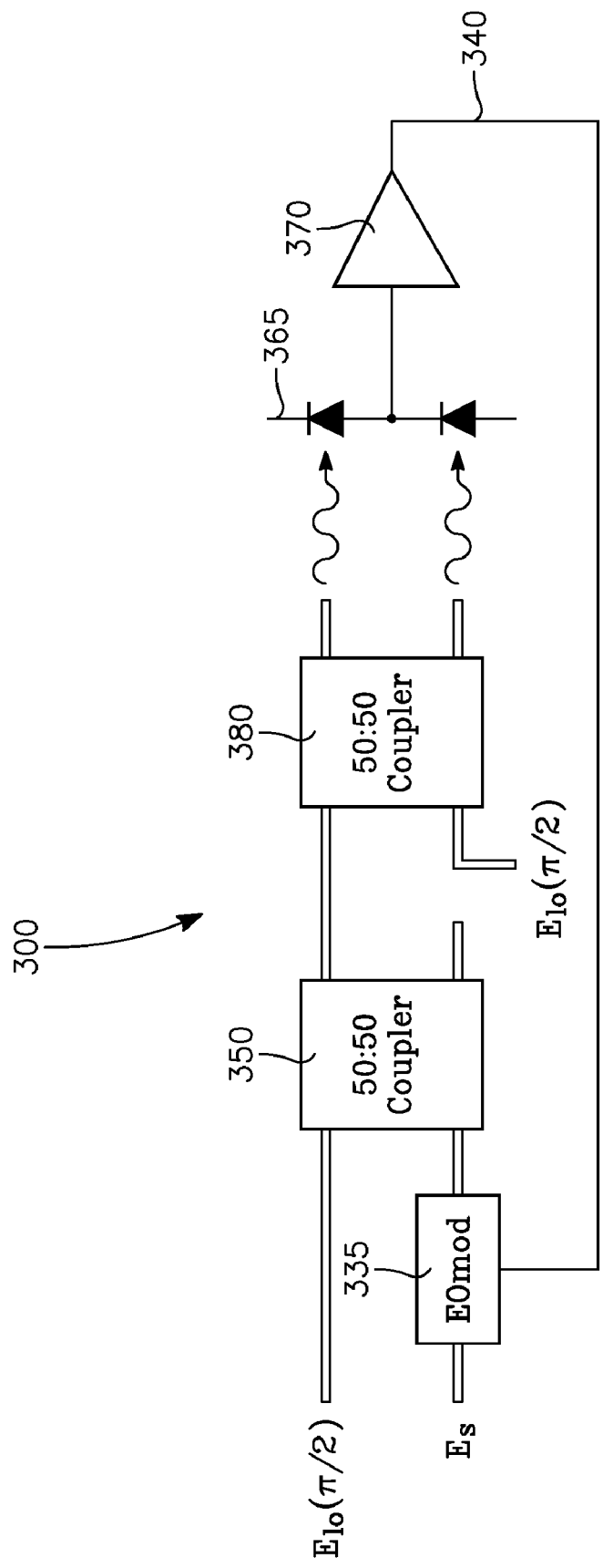
FIG. 3 shows a simplified circuit diagram of a carrier suppressed phase detector.
Figure 4:
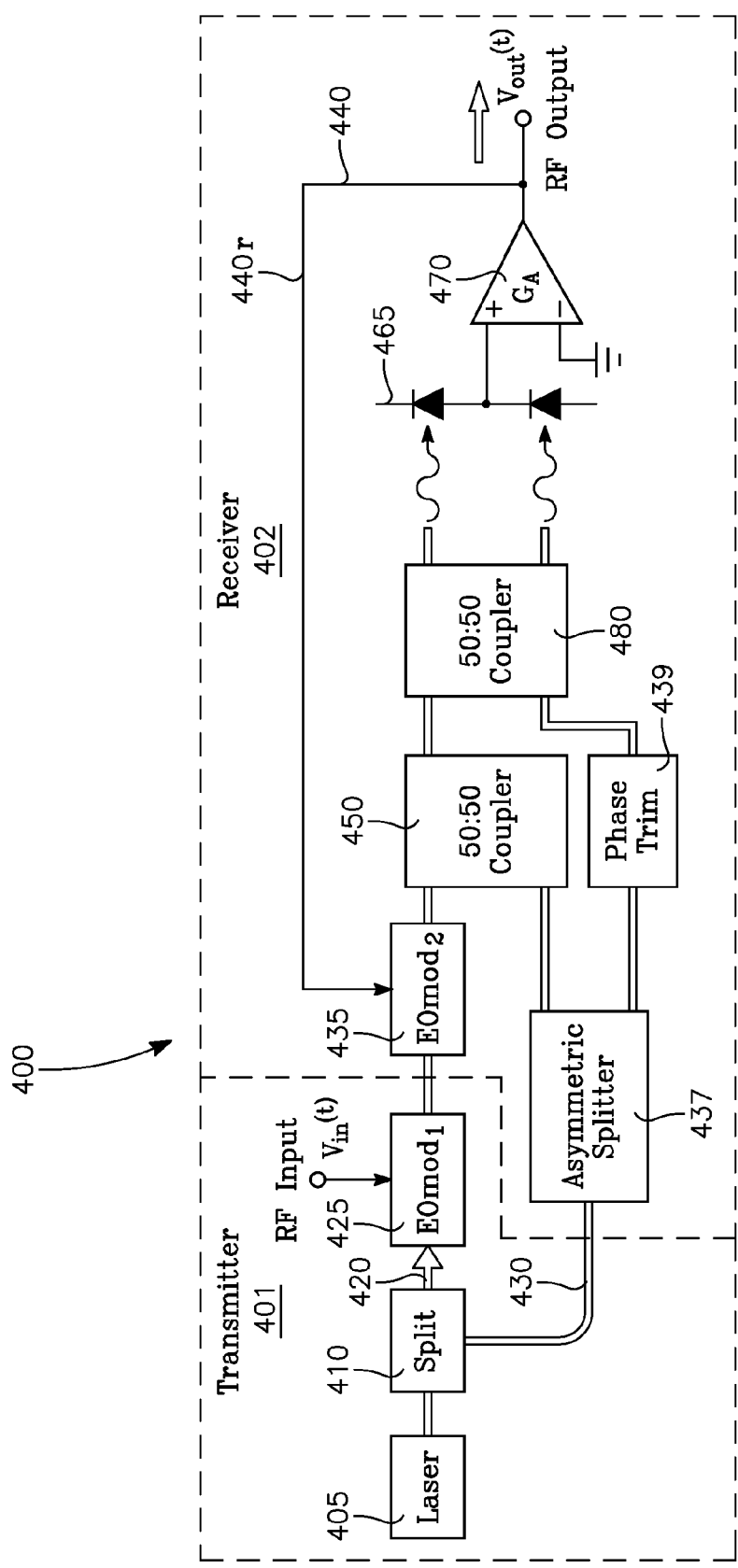
FIG. 4 shows a simplified circuit diagram of an embodiment of a phase-modulated RF-photonic link with carrier suppression.
Figure 5:
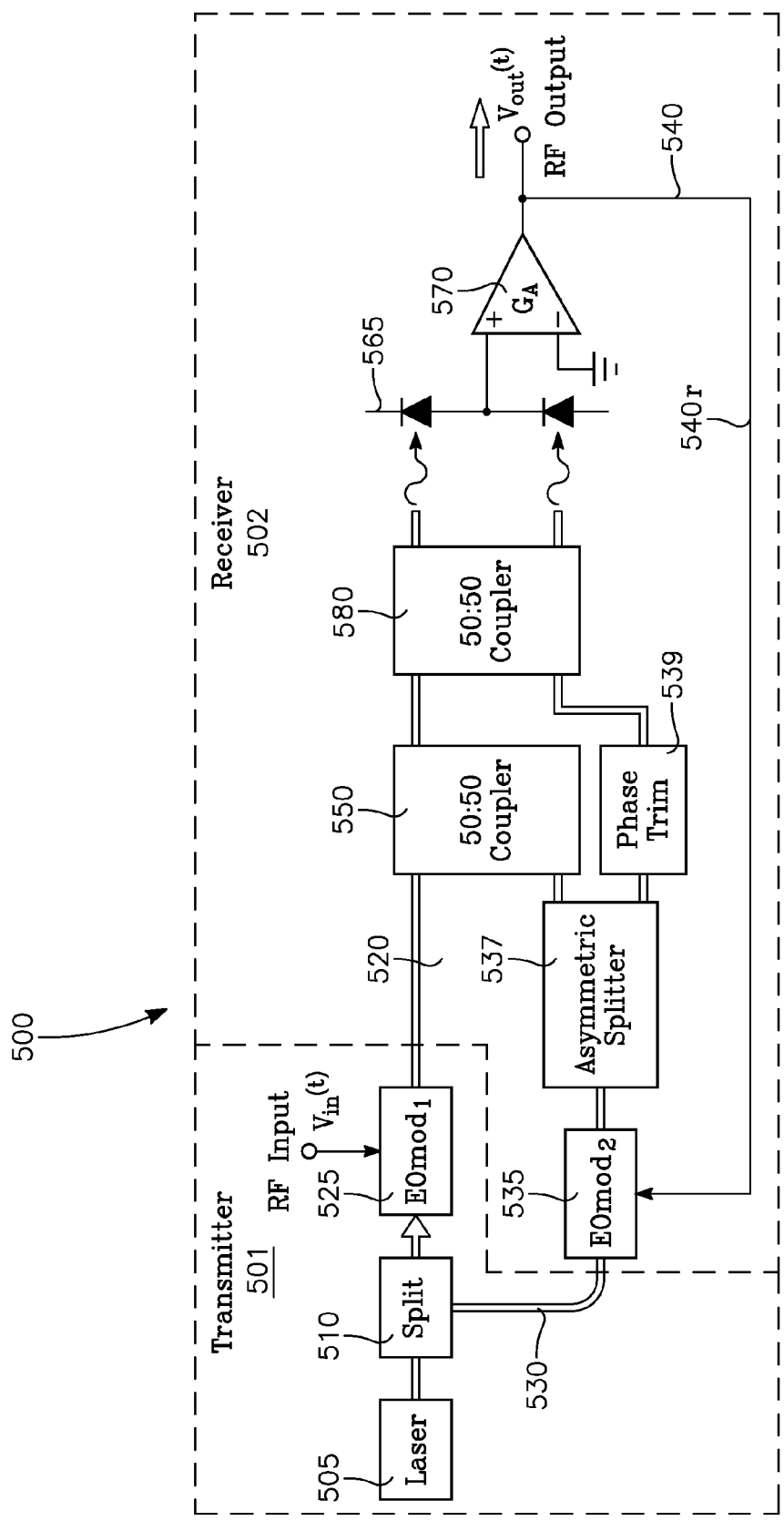
FIG. 5, shown is a simplified circuit diagram of an embodiment of a phase-modulated RF-photonic link with carrier suppression.

Referring to FIGS. 1 and 2, in some embodiments, not only is a phase-tracking negative feed back loop 140 or 240 provided at the receiver 102 or 202, but also carrier-suppression circuitry 300, shown in FIG. 3, is included in a phase-modulated RF-photonic link 400 and 500, as shown in FIGS. 4 and 5.

Carrier Supression

Carrier suppression allows suppression of the carrier of the phase-modulated (PM) optical signal, so that only the energy in the phase modulated sidebands reaches the photodetector(s). This allows the use of carriers with very high energy, and hence achieves a very high Signal to Noise Ratio (SNR), without having the accompanying concerns of photodetector overload and burnout. This improves the spur free dynamic range. Further, this technique can also mitigate the effects of detector nonlinearity.

In conventional phase modulation (not shown), the carrier of a phase modulated signal can be suppressed at the transmitter by using a Mach-Zehnder modulator with single-sided drive. The DC-balance of the modulator's interferometer is adjusted so that the light in one arm is 180 degrees out-of-phase with that in the other, so that with no applied modulation the two lightwaves exactly cancel in the interferometer's summing junction. When a modulation signal is applied to the modulator, this perfect cancellation is destroyed, and a small amount of light passes through the modulator. The energy in this light is that of the phase modulation sidebands.

Such a technique for carrier suppression, however, is unsatisfactory for systems requiring very high linearity. This is because the magnitude of the broadcast sideband is proportional to 2 sin(φ/2), where φ is the time-dependent modulation angle. Thus, if one has a transmitter that produces a phase shift φ that is linearly related to the drive signal, the received signal will be distorted because it is proportional to 2 sin(φ/2), and not to φ. Although for small signals the difference between 2 sin(φ/2) and φ is not appreciable, the difference nevertheless causes distortion that limits the performance of systems requiring high Spur Free Dynamic Range (SFDR).

The Spur Free Dynamic Range (SFDR) for a coherent PM optical link is given by:

$$SFDR = 4\left(\frac{I_s}{e\Delta f}\right)^{2/3} G_L^2$$

where I$_s$ is the photodetector current of the carrier lightwave, e the electron charge, Δf the receiver noise bandwidth, and G$_L$ the gain of the negative feedback loop. G$_L$ is unity for conventional phase detection and greater than unity for the phase-tracking approach that we shall describe below.

To get the largest possible SFDR, I$_s$ should be as large as possible. The only real constraint on doing this is the current-handling capability of the photodiodes, which is presently limited in conventional technologies to about 20-30 mA. To get the benefit of higher current levels using such technologies, some form of carrier suppression must be used.

It is possible to suppress the carrier completely at the transmitter by adding a field that is 180° out of phase with the carrier, and then transmit and receive a small sideband signal that is proportional to 2 sin(φ/2).

After being processed by the coherent receiver (photodetectors 265 in FIG. 2), the signal input to the amplifier will be just as large as if the entire vector, including the carrier, had been transmitted and detected. Thus, it is possible to realize the benefit of extremely large values of I$_s$, without destroying the photodetectors 265, because the DC detector current produced by the resultant vector is several orders of magnitude smaller than I$_s$.

There is, however, a fundamental problem in doing this for PM if the goal is very high SFDR. If the carrier is suppressed at the transmitter, the information necessary to accurately recover the phase angle φ is lost, i.e., it is possible to accurately determine the phase angle φ from the resultant vector without knowing the length of the original vector. By transmitting only the resultant vector, it is not possible to achieve an SFDR higher than that for conventional phase or amplitude modulation, both of which are limited by the distortion caused by the sinusoidal dependence on the phase angle φ.

As such, to accurately measure the phase-modulation of an incoming wave, the sidebands and the carrier are necessary. Both are needed to recapture the phase angle φ. The implementation discussed below uses the complete incoming wave (carrier plus sidebands) to determine the phase angle φ, and then strips off the carrier before the signal reaches the photodetectors. Thus, it is possible to have both a high SNR and a small detector photocurrent.

Various embodiments discussed herein can provide a super-high linearity analog optical link that could be used either with fiber-optics or free-space communications. Phase modulation is discussed herein because the phase modulation process is perfectly linear. Thus, if one can make a receiver that is also has ultra high linearity, a high-linearity link will result.

Turning to FIG. 3, shown is a simplified circuit diagram of a carrier suppressed phase detector 300 using negative feedback 340. With the embodiment of FIG. 3, the complete phase-modulated lightwave E$_s$ is transmitted and passed to the received lightwave through a electro-optic phase tracking modulator 335 that subtracts an angle θ from the phase of the incoming lightwave. This phase-shifted lightwave is then added with coupler 350 to a local oscillator lightwave E$_{lo}$(π/2) whose direction, in the Argand plane, is perfectly anti-parallel to the carrier vector. The summation, which is actually a subtraction, removes the carrier, leaving a resultant vector, which will be used to recover the phase angle φ.

When the phase tracking loop is functioning correctly, the resultant vector will have a vanishingly-small length, which means that the angle θ essentially equals the phase angle φ, and near-perfect tracking has been achieved. A non-zero resultant vector generates an error voltage that tells the loop 340 in which direction and by how much it must shift angle θ with the electro-optic phase tracking modulator 335 to reduce the error voltage to zero.

Simple photodetection of the lightwave of the resultant vector is not adequate to control the phase-tracking loop 340. The measured signal would be quadratic in vector length, and would give no information about the vector direction (positive or negative). To get an error signal that gives both the vector's linear length and its direction, coherent detection is necessary. To obtain the vector direction, the resultant vector from the coupler 350 is optically coupled with the local oscillator signal $E_{lo}(\pi/2)$ using coupler 380, which in some embodiments may be a 50:50 optical coupler.

The current at the output of the photodetectors 365 is given by:

$$I(t) = \sqrt{2I_s I_{lo}} \sin[\phi(t) - \theta(t)]$$

I(t) is amplified by a transimpedance amplifier 370, which both amplifies it and converts it into a voltage. This voltage is used to drive the electro-optic phase tracking modulator 335 that shifts the phase of the incoming signal $E_s$ (or that of the local oscillator $E_{lo}(\pi/2)$) by angle θ. The high gain of the negative feedback created by this loop 340 drives the error signal, which is proportional to φ−θ, to a vanishingly-small value. The finiteness of this value determines the ultimate value of the SFDR achievable with this approach.

The current I(t) is a factor of $\sqrt{2}$ smaller than the signal one would achieve if all of the energy of the incoming lightwave were directed into a standard dual-balanced receiver. To get the same SNR and SFDR of a signal beam having a detector-equivalent power of $I_s$, one must transmit a power of $2I_s$. The price paid for using this scheme is therefore additional power: additional power in the transmit beam, and the power needed to supply the anti-parallel lightwave at the receiver.

The requirement that the summed optical fields $E_s$ and $E_{lo}(\pi/2)$ have equal magnitudes is not a stringent one. This is because the coherent receiver (photodiodes 365 and amplifier 370) of FIG. 3 selects only the orthogonal (vertical) component of the resultant vector, a mismatch in the magnitudes of the two vectors will not affect the accuracy of the detection process; it will simply increase the DC current in the detectors by a small amount (because the carrier has not been completely suppressed).

The carrier suppression technique discussed herein can be used in receivers employing conventional homodyne detection. It provides significant benefit, however, when used with receivers that employ negative feedback to track the phase because the combination of phase tracking and carrier suppression can yield an optical communication link with ultra-high linearity.

RF Photonic Link with Carrier Supression

Turning to FIG. 4, shown is a simplified circuit diagram of an embodiment of a phase-modulated RF-photonic link with carrier suppression 400. In the transmitter 401, the laser 405 supplies light to the signal arm 420 and the local oscillator arm 430 via a splitter 410. The splitter 410 may be a 1:r splitter, where the r is selected so that the amplitude of the signal to the coupler 450 suppresses the carrier signal of the signal arm 420. Modulator 425 in the signal arm 420 is modulated by the RF Input signal $V_{in}(t)$. The RF input modulated signal from the modulator 425 is supplied to the phase tracking modulator 435. In this embodiment, the phase lock loop 440 provides the negative feedback of the RF Output signal $V_{out}(t)$ to the phase tracking modulator 435, in the signal arm 420. The phase tracking modulator 435 facilitates coherent phase-detection in the receiver 402.

The local oscillator arm 430 has an asymmetric splitter 437, which splits the signal in the local oscillator arm 430 providing a portion of the signal in the local oscillator arm 430 to the coupler 450. Thus, the phase lock loop modulated signal of the signal arm 420 and the local oscillator signal of the local oscillator arm 430 are optically coupled with an optical coupler 450, such as with a 50:50 optical coupler. The optical coupler 450 provides the carrier suppressed sideband signal to the optical coupler 480 where it is optically coupled with a small portion of a signal from the local oscillator arm 430. The local oscillator signal is split with an asymmetric splitter 437 and supplied to the optical coupler 480 via an optical phase trimmer 439. The asymmetric splitter 437 may be a 100:1 splitter, for example, and the phase trimmer 439 can be a static phase shifter for shifting the phase of the local oscillator signal to compensate for any differences between the path length of the signal arm 420 and the local oscillator arm 430. Additional phase trimmers and/or different locations are possible to compensate for varying path lengths in the signal arm 420 and local oscillator arm 430.

The output of the optical coupler 480 is supplied to the photodetectors 465. As with the other embodiments discussed herein, the optical coupler 480 along with the photodetectors 465 are a dual balanced detection system that couples the photonic signals of the local oscillator arm 430 with those of the signal arm 420 and provides a differential output signal to the amplifier 470. Thus, the photodetected signals are supplied to an amplifier 470, which provides the RF Output $V_{out}(t)$. The return path 440r of the phase lock loop 440 couples the RF Output signal $V_{out}(t)$ to the phase tracking modulator 435.

Turning to FIG. 5, shown is a simplified circuit diagram of an alternate embodiment of a phase-modulated RF-photonic link with carrier suppression 500. In the embodiment of FIG. 5, the phase lock loop 540 provides the negative feedback to a phase tracking modulator 535, coupled in the local oscillator arm 530. Thus, in the transmitter 501, the laser 505 supplies a local oscillator signal to the local oscillator arm 530 via splitter 510, which is modulated in the receiver 502 with phase tracking modulator 535 by a signal from the phase tracking loop 540. The splitter 510 may be a 1:r splitter, where r is selected so that the amplitude of the signal to the coupler 550 suppresses the carrier signal of the signal arm 520. The modulated local oscillator signal is optically coupled with the RF Input modulated signal from the modulator 525 to provide the carrier suppressed sideband signal. An asymmetric splitter 537 and a phase trimmer 539 supply a portion of the modulated local oscillator signal to an optical coupler 580 for coupling with the carrier suppressed sideband signal from the coupler 550. The photodetector 565 supply signals to an amplifier 570, which provides the RF Output $V_{out}(t)$. The return path 540r of the phase lock loop 540 couples the RF Output signal $V_{out}(t)$ to the phase tracking modulator 535.

As such, various embodiments allow determination of the phase angle φ as accurately as desired, while simultaneously suppressing the carrier at the detector. When combined with negative feedback, some embodiments could allow SFDR values approaching 150 dBm $Hz^{2/3}$, a value which is 25 dB higher than conventional analog optical links. The use of negative feedback without this type of carrier suppression would reduce the achievable SFDR value by approximately 7-10 dB. Thus, carrier suppression can make an important contribution to the net SFDR of such an RF photonic link.

In some embodiments discussed above, components such as the phase-tracking modulator, the coupler for combining the signal arm and LO-arm, i.e. a multimode interference (MMI), the photodetectors, i.e. waveguide-coupled PIN photodiodes, and the OpAmp may be all integrated on an InP substrate. According to simulations by the present inventors, the phase-tracking modulator can be realized with thin films (such as $BaTiO_3$) that can demonstrate ($V_\pi \times$length) product of 1 to 2. For the above ($V_\pi \times$length) product, it is possible to fabricate modulators as short as 200-400 µm and still obtain a $(V_\pi)_\theta$ of ~50 V. This will allow us to satisfy the loop-stability requirement for a phase-tracking loop with a time-delay constraint of 13.3 psec (or a physical length constraint of 1.14 mm in InP), for an SFDR enhancement (ΔSFDR) of 23 dB.

Various embodiments and implementations described herein may be embodied and/or implemented with down conversion disclosed in the above referenced invention entitled DOWN CONVERSION FOR DISTORTION FREE RECOVERY OF A PHASE MODULATED OPTICAL SIGNAL, by Robert Hayes, incorporated by reference. Thus, down conversion may be utilized in the receivers 102, 202, 402, and 502, of the various embodiments and implementations disclosed herein. In the embodiments discussed above, the amplifiers 170, 270, 370, 470, and 570 may be replaced with the quadrature circuit 270.

Having described this invention in connection with a number of embodiments, modification will now certainly suggest itself to those skilled in the art. As such, the invention is not to be limited to the disclosed embodiments except as required by the appended claims.

What is claimed is:

1. A method in an RF photonic link circuit having an RF input and an RF output, the method comprising:
    a) modulating an optical carrier signal in a signal arm with the RF input to provide an RF modulated signal;
    b) modulating the RF input modulated signal with a negative feedback phase lock loop from the RF output to provide a phase loop modulated signal;
    c) optically coupling the phase loop modulated signal and a local oscillator signal arm to provide a coupled output;
    d) photodetecting the coupled output and generating a photodetected output signal;
    e) amplifying the photodetected signal to provide the RF output;
    f) suppressing the optical carrier signal to provide a carrier suppressed signal prior to photodetecting;
    g) wherein suppressing the optical carrier signal further comprises asymmetrically splitting the local oscillator signal; and
    h) optically coupling a portion of the asymmetrically split local oscillator signal with the phase loop modulated signal so as to suppress the optical carrier signal.

2. The method of claim 1 further comprising optically coupling the carrier suppressed signal with a second portion of the asymmetrically split local oscillator signal prior to photodetecting.

3. The method of claim 2 further comprising shifting a phase of the second portion of asymmetrically split local oscillator signal prior to optically coupling the second portion of the asymmetrically split local oscillator signal with the phase loop modulated signal.

4. The method of claim 1 further comprising splitting an optical signal from a laser source to provide the optical carrier signal and the optical local oscillator signal.

5. The method of claim 1, wherein photodetecting and generating the photodetected output signal comprises differentially combining photodetected signals.

6. A linearized RF photonic link having an RF input and an RF output, the RF photonic link comprising:
    a) a signal arm comprising:
        i) an electro-optic input modulator, the RF input of the RF photonic link being a modulating input to the electro-optic modulator; and
        ii) an electro-optic phase tracking modulator coupled to the input modulator, the phase tracking modulator comprising a modulating input;
    b) a local oscillator arm;
    c) a light source for supplying light to the signal arm and the local oscillator arm;
    d) an optical coupler connected to optically couple modulated output signals from the phase tracking modulator and signals from the local oscillator arm;
    e) a photodetector circuit positioned to be capable of detecting signals coupled by the optical coupler and providing an output;
    f) an electrical amplifier positioned to provide the RF output responsive to the output of the photodetector circuit output;
    g) a phase tracking negative feedback loop circuit coupled between the RF output of the amplifier and the modulating input of the phase tracking modulator;
    h) a carrier suppression circuit constructed so as to suppress a carrier signal of the signal arm;
    i) an asymmetric splitter connected in the local oscillator arm to provide signals to the coupler for suppressing the carrier signal; and
    j) a second coupler, the asymmetric splitter being connected from the local oscillator arm to the second optical coupler.

7. The RF photonic link of claim 6 further comprising a phase trimmer connected between the asymmetric splitter and the second coupler.

8. The RF photonic link of claim 6, wherein the phase tracking negative feedback loop comprises a phase lock circuit.

9. The RF photonic link of claim 6, wherein the photodetector circuit comprises differentially connected photodiodes.

10. The RF photonic link of claim 6, wherein the light source comprises a laser.

11. The RF photonic link of claim 6, wherein the phase tracking negative feed back loop has a length such that a time delay of the phase tracking loop is less than 180 degrees at a highest operating frequency having a unity gain greater than 1 for the phase tracking loop.

12. A receiver for an RF photonic link, the receiver comprising:
    a) a local oscillator arm adapted to receive an oscillator signal from a transmitter;
    b) a signal arm comprising an electro-optic phase tracking modulator adapted to receive an RF modulated oscillator signal from the transmitter, the phase tracking modulator comprising a modulating input;
    c) an optical coupler connected to optically couple modulated output signals from the phase tracking modulator and signals from the local oscillator arm;
    d) a photodetector circuit positioned to be capable of detecting signals coupled by the optical coupler and providing an output;
    e) an electrical amplifier positioned to provide an RF output responsive to the output of the photodetector circuit output;

f) a phase tracking negative feedback loop circuit coupled between the RF output of the amplifier and the modulating input of the phase tracking modulator;

g) a carrier suppression circuit constructed so as to suppress a carrier signal of the signal arm;

h) an asymmetric splitter connected in the local oscillator arm to provide signals to the coupler for suppressing the carrier signal; and i) a second coupler, the asymmetric splitter being connected from the local oscillator arm to the second optical coupler.

13. The RF photonic link of claim 12 further comprising a phase trimmer connected between the asymmetric splitter and the second coupler.

14. The RF photonic link of claim 12, wherein the phase tracking negative feedback loop comprises a phase lock circuit.

15. The RF photonic link of claim 12, wherein the photodetector circuit comprises differentially connected photodiodes.

16. The RF photonic link of claim 12, wherein the phase tracking negative feed back loop has a length such that a time delay of the phase tracking loop is less than 180 degrees at a highest operating frequency having a unity gain greater than 1 for the phase tracking loop.

* * * * *